United States Patent
Oyman et al.

(10) Patent No.: US 9,246,842 B2
(45) Date of Patent: Jan. 26, 2016

(54) QOE-AWARE RADIO ACCESS NETWORK ARCHITECTURE FOR HTTP-BASED VIDEO STREAMING

(71) Applicant: INTEL CORPORATION, Santa Clara, CA (US)

(72) Inventors: Ozgur Oyman, San Jose, CA (US); Debdeep Chatterjee, Santa Clara, CA (US); Apostolos Tolis Papathanassiou, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 325 days.

(21) Appl. No.: 13/688,423

(22) Filed: Nov. 29, 2012

(65) Prior Publication Data

US 2013/0286868 A1     Oct. 31, 2013

Related U.S. Application Data

(60) Provisional application No. 61/639,795, filed on Apr. 27, 2012.

(51) Int. Cl.
*H04L 12/917* (2013.01)
*H04L 12/24* (2006.01)
*H04W 24/06* (2009.01)
(Continued)

(52) U.S. Cl.
CPC ............ *H04L 47/76* (2013.01); *H04L 41/5003* (2013.01); *H04L 41/5006* (2013.01); *H04L 41/5009* (2013.01); *H04L 47/70* (2013.01); *H04L 65/80* (2013.01); *H04L 67/322* (2013.01); *H04W 24/06* (2013.01); *H04W 24/08* (2013.01);
(Continued)

(58) Field of Classification Search
CPC ....... H04W 24/08; H04L 47/76; H04L 47/70; H04L 65/80; H04L 67/322; H04L 41/5003; H04L 41/5006; H04L 41/5009
See application file for complete search history.

(56) References Cited

U.S. PATENT DOCUMENTS

2004/0082363 A1 *  4/2004  Hosein ................. H04W 28/18
                                                455/560
2004/0186877 A1 *  9/2004  Wang ................ H04L 29/06027
                                                709/200

(Continued)

FOREIGN PATENT DOCUMENTS

KR    10-2011-0009579 A    1/2011
WO    2012/015234 A2       2/2012

OTHER PUBLICATIONS

International Search Report and Written Opinion received for International Application No. PCT/US2013/037580, mailed on Aug. 12, 2013, 13 pages.

(Continued)

*Primary Examiner* — Omer S Mian
(74) *Attorney, Agent, or Firm* — Thorpe North & Western LLP

(57) ABSTRACT

Technology for adapting a video stream using a quality of experience (QoE) report is disclosed. One method can include a QoE-aware system in a node of a radio access network (RAN) receiving a QoE report with at least one QoE metric from a wireless device. The QoE-aware system can extract the at least one QoE metric in a function layer from a QoE reporting layer. The function layer can be a layer other than the QoE reporting layer. The QoE-aware system can modify a layer function in the function layer to improve the QoE metric.

27 Claims, 7 Drawing Sheets

(51) Int. Cl.
H04W 24/08 (2009.01)
H04L 12/911 (2013.01)
H04L 29/06 (2006.01)
H04L 29/08 (2006.01)
H04W 52/02 (2009.01)
H04W 24/02 (2009.01)

(52) U.S. Cl.
CPC .......... H04W 52/0206 (2013.01); *H04W 24/02* (2013.01); *Y02B 60/50* (2013.01)

(56) References Cited

U.S. PATENT DOCUMENTS

| | | | |
|---|---|---|---|
| 2005/0089043 A1 | 4/2005 | Seckin et al. | |
| 2007/0097987 A1* | 5/2007 | Rey | H04L 65/608 370/395.52 |
| 2009/0147684 A1 | 6/2009 | Majidi-Ahy | |
| 2009/0219990 A1 | 9/2009 | Han et al. | |
| 2013/0003578 A1* | 1/2013 | Hu et al. | 370/252 |

OTHER PUBLICATIONS

3rd Generation Partnership Project; "Technical Specification Group Services and System Aspects", Transparent end-to-end Packet-switched Streaming Service (PSS);Progressive Download and Dynamic Adaptive Streaming over HTTP (3GP-DASH), 3GPP TS 26.247, vol. 10.2.0 (Jun. 2012), pp. 1-110.

Oyman et al., "Signaling Methods for Multimedia-Aware Radio and Network Adaptation" U.S. Appl. No. 12/973,412, filed on Dec. 20, 2010, 49 pages.

Singh et al., "Video capacity and QoE enhancements over LTE," IEEE ICC 2012, Jun. 10-15, 2012, Ottawa, Canada, 6 pages.

Chatterjee et al., "Wireless Multimedia Quality of Experience Reporting", U.S. Appl. No. 13/674,617, filed Nov. 12, 2012, 37 pages.

\* cited by examiner

QOE-AWARE RADIO ACCESS NETWORK ARCHITECTURE FOR HTTP-BASED VIDEO STREAMING

RELATED APPLICATIONS

This application claims the benefit of and hereby incorporates by reference U.S. Provisional Patent Application Ser. No. 61/639,795, filed Apr. 27, 2012.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

The wireless device can be used receive multimedia delivery of Internet video using various protocols, such as hypertext transfer protocol (HTTP) streaming. A protocol to provide HTTP-based delivery of video streaming can include dynamic adaptive streaming over HTTP (DASH).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
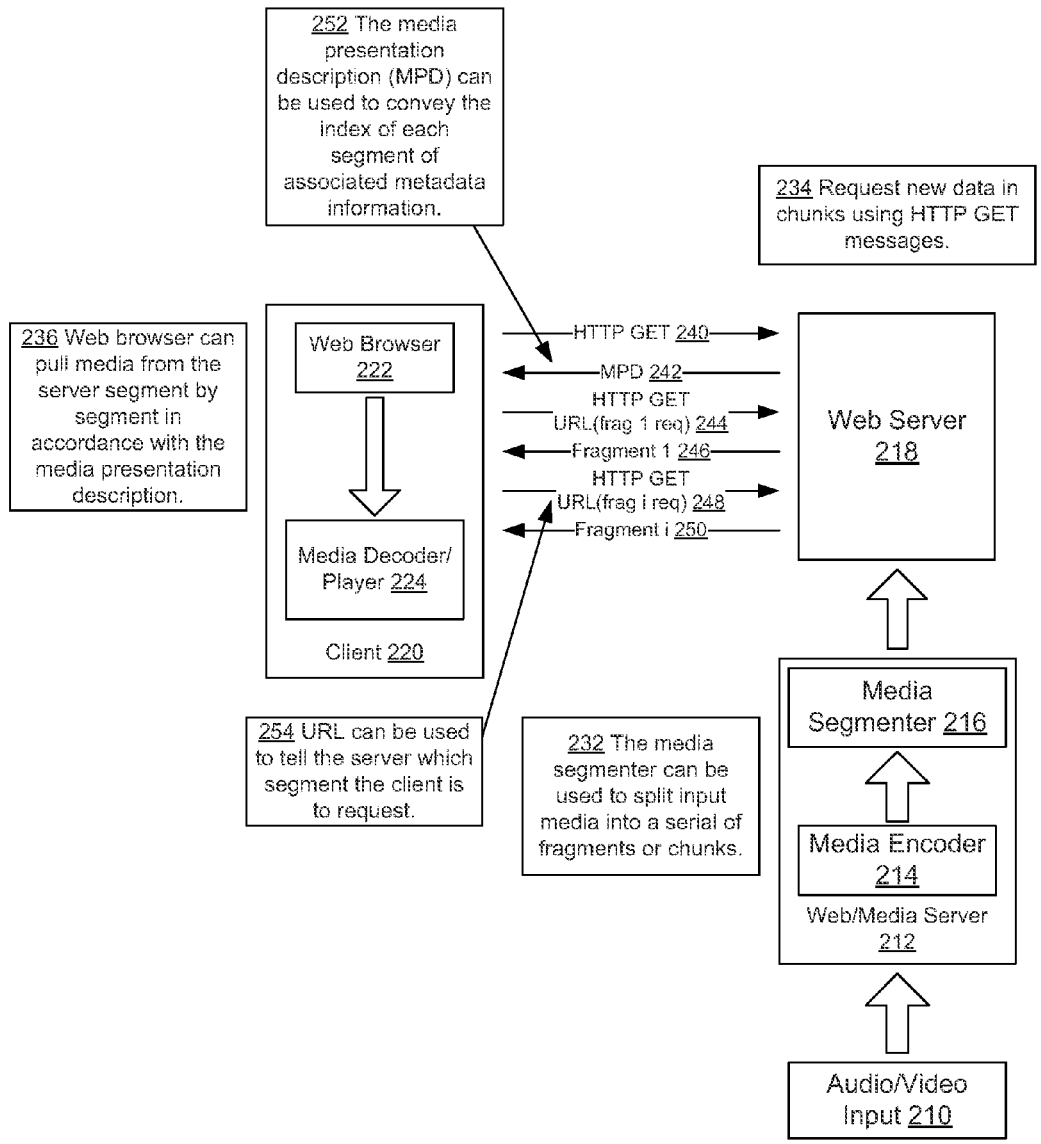
FIG. 1 illustrates a block diagram at a client and servers for dynamic adaptive streaming over hypertext transfer protocol (HTTP) (DASH) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Hypertext transfer protocol (HTTP) streaming can be used as a form of multimedia delivery of Internet video. In HTTP streaming, a multimedia file can be partitioned into one or more segments and delivered to a client using the HTTP protocol. HTTP-based delivery can provide reliability and deployment simplicity due to a broad adoption of both HTTP and HTTP's underlying protocols, including transmission control protocol (TCP)/internet protocol (IP). HTTP-based delivery can enable easy and effortless streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side. Examples of HTTP streaming technologies can include Microsoft IIS Smooth Streaming, Apple HTTP Live Streaming, and Adobe HTTP Dynamic Streaming.

Dynamic adaptive streaming over HTTP (DASH) can be a standardized HTTP streaming protocol. DASH can specifie formats for a media presentation description (MPD) metadata file that provides information on the structure and different versions of the media content representations stored in the server as well as the segment formats, i.e., containing information on the initialization and media segments for a media player (e.g., the media player can look at initialization segment to determine a container format and media timing information) to ensure mapping of segments into media presentation timeline for switching and synchronous presentation with other representations. DASH technology has also been standardized by other organizations, such as the Moving Picture Experts Group (MPEG), Open IPTV Forum (OIPF), and Hybrid Broadcast Broadband TV (HbbTV).

A DASH client can receive multimedia content by downloading the segments through a series of HTTP request-response transactions. DASH can provide the ability to dynamically switch between different bit rate representations of the media content as the available bandwidth changes. Thus, DASH can allow for fast adaptation to changing network and wireless link conditions, user preferences and device capabilities, such as display resolution, the type of central processing unit (CPU) employed, or memory resources available. The dynamic adaptation of DASH can provide a better quality of experience (QoE) for a user, with shorter startup delays and fewer rebuffering events. Quality of experience (QoE), also referred to as a quality of user experience, can be a subjective measure of a customer's experiences with a service, application, and/or multimedia delivery. QoE systems can measure metrics that a user or a customer can directly perceive as a quality parameter.

In DASH, a media presentation description (MPD) metadata file can provide information on the structure and different versions of the media content representations stored in a web/media server 212, as illustrated in FIG. 1. The different versions of the media content representations can include different bitrates, frame rates, resolutions, codec types, or other similar types of information. In addition, DASH can also specify the segment formats, which can contain information on initialization and media segments for a media engine to ensure mapping of segments into a media presentation timeline for switching and synchronous presentation with other representations. Based on the MPD metadata information, which describes the relationship of the segments and how the segments form a media presentation, a client 220 can request the segments using an HTTP GET 240 message or a series of partial GET messages. The client can control the streaming session, such as managing an on-time request and smooth playout of a sequence of segments, or potentially adjusting bitrates or other attributes, to react to changes of a device state or a user preference.

FIG. 1 illustrates a DASH-based streaming framework. A media encoder 214 in the web/media server 212 can encode an input media from an audio/video input 210 into a format for storage or streaming. A media segmenter 216 can be used to split the input media into a serial of fragments or chunks 232, which can be provided to a web server 218. The client 220 can request new data in chunks using HTTP GET messages 234 sent to the web server (e.g., HTTP server).

For example, a web browser 222 of the client 220 can request multimedia content using a HTTP GET message 240. The web server 218 can provide the client with a MPD 242 for the multimedia content. The MPD can be used to convey the index of each segment and the segment's corresponding locations as shown in the associated metadata information 252. The web browser can pull media from the server segment by segment in accordance with the MPD 242 as shown in 236. For instance, the web browser can request a first fragment using a HTTP GET URL (frag 1 req) 244. An uniform resource locator (URL) or universal resource locator can be used to tell the web server which segment the client is to request 254. The web server can provide the first fragment (i.e., fragment 1 246). For subsequent fragments, the web browser can request a fragment i using a HTTP GET URL (frag i req) 248, where i is an integer index of the fragment. As a result, the web server can provide a fragment i 250. The fragments can be presented to the client via a media decoder/player 224.

In computer networking and/or wireless communication, different functions can be provided by different layers in a protocol stack. The protocol stack can be an implementation of a computer networking protocol suite. The protocol stack (or protocol suite) can include the definition and implementation of the protocols. Each layer or protocol in the protocol stack can provide a specified function. The modularization of the layers and protocols can make design and evaluation of the computer networking and/or wireless communication easier. In an example, each protocol module or layer module in a stack of protocols may communicate with at least two other modules (e.g., a higher layer and a lower layer). The lowest protocol or layer can provide low-level, physical interaction with the hardware. Each higher layer may add more features. The upper or topmost layers can include user applications and services.

Figure 3:
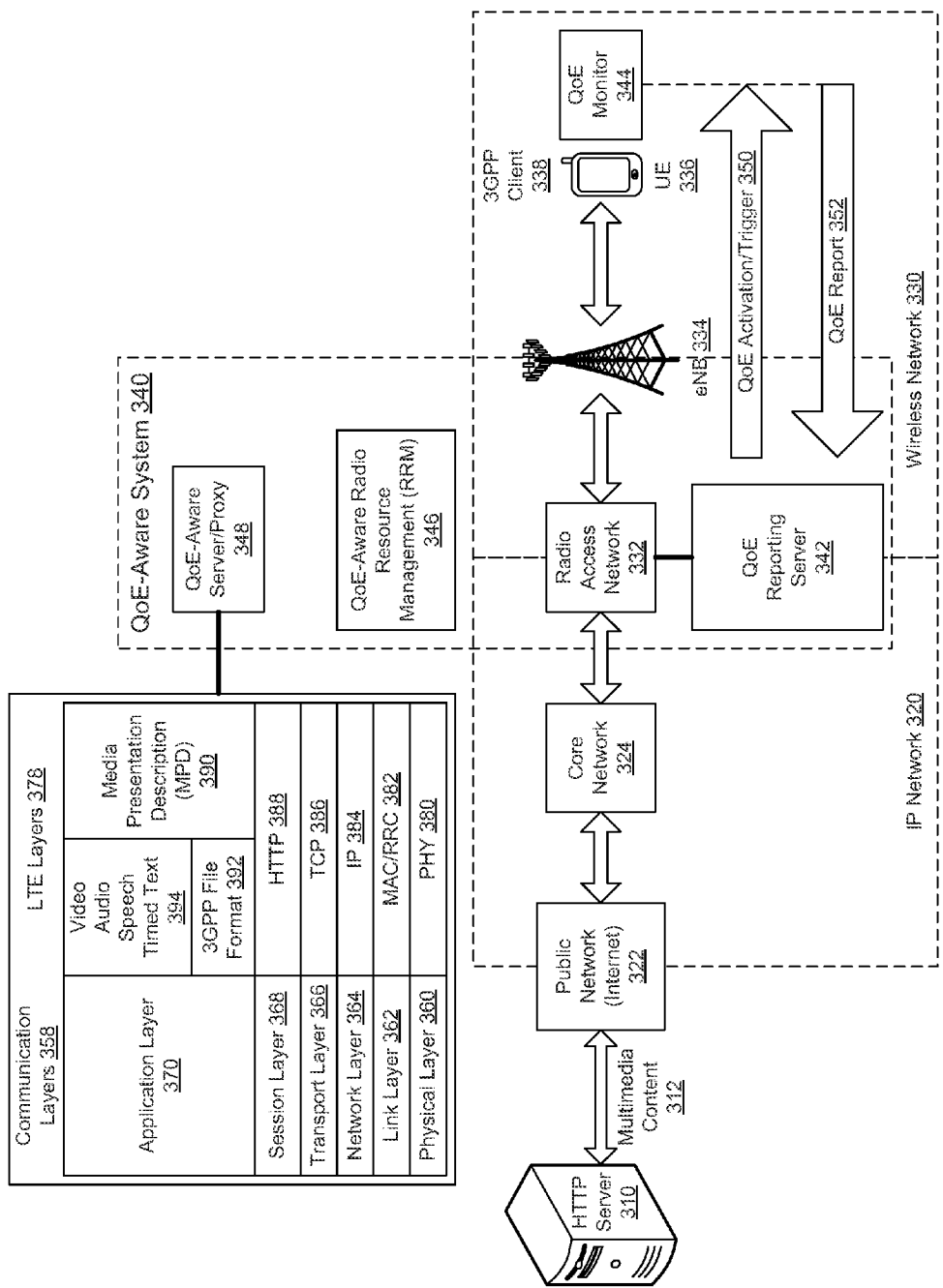
FIG. 3 illustrates a block diagram of a quality of experience-aware (QoE-aware) radio access network (RAN) architecture for hypertext transfer protocol-based (HTTP-based) video streaming in accordance with an example.

In the LTE system, communication layers 358 (e.g., LTE layers 378) can include a physical 360 (PHY 380) (i.e., layer 1 (L1)), a data link or link 362 (i.e., layer 2 (L2)), a network 362 (i.e., layer 3 (L3)), a transport 366 (i.e., layer 4 (L4)), a session 368 (i.e., layer 5 (L5)), and an application 370 layer, as illustrated in FIG. 3. In an example, the link layer can include media access control (MAC), radio link control (RLC), packet data convergence protocol (PDCP), radio resource control (RRC) layers 382. The network layer can use an internet protocol (IP) 384, and the transport layer can use a transmission control protocol (TCP) 386 in an internet protocol suite. The session layer can use a HTTP 388. The application layer can include video, audio, speech, and timed text 294, a 3GPP file format 392, or a media presentation description (MPD) 390.

To improve or enhance a user quality of experience (QoE) or to increase a service quality in wireless multimedia communications, a cross-layer design methodology or architecture can be used where information from one layer can be used to make a decision at another layer. Quality degradation can generally be caused by factors, such as high distortion levels, limited bandwidth, excessive delay, power constraints, and computational complexity limitations.

An aspect of QoE-driven cross-layer optimization can be based on resource management strategies at the lower layers (e.g., PHY, MAC, network, and transport layers) by considering specific characteristics of a video application. A first cross-layer capability can provide a PHY, MAC, or NET-aware (PHY/MAC/NET-aware) bit rate adaptation at the codec level to enable a streaming service to adapt a bit rate to varying network conditions (e.g., due to changing resource availability, time-varying nature of the wireless channel) toward ensuring a higher QoE while maintaining interrupt-free playback of the multimedia (or reduced interruption during playback of the multimedia).

Another aspect of QoE-driven cross-layer optimization can be to use video compression and streaming processes after taking into account mechanisms provided by the lower layers for error control and resource allocation. A second cross-layer capability can provide an application-aware PHY, MAC, and/or NET (PHY/MAC/NET) adaptation at the radio and network levels in order to perform PHY/MAC/NET-layer functions, such as link adaptation and resource allocation by exploiting knowledge of various application-layer attributes associated with the video content and service. For example, the knowledge of the rate-distortion characteristics of the video stream can allow for performing QoE-aware scheduling at the PHY/MAC layer toward enhancing video quality.

Figure 2:
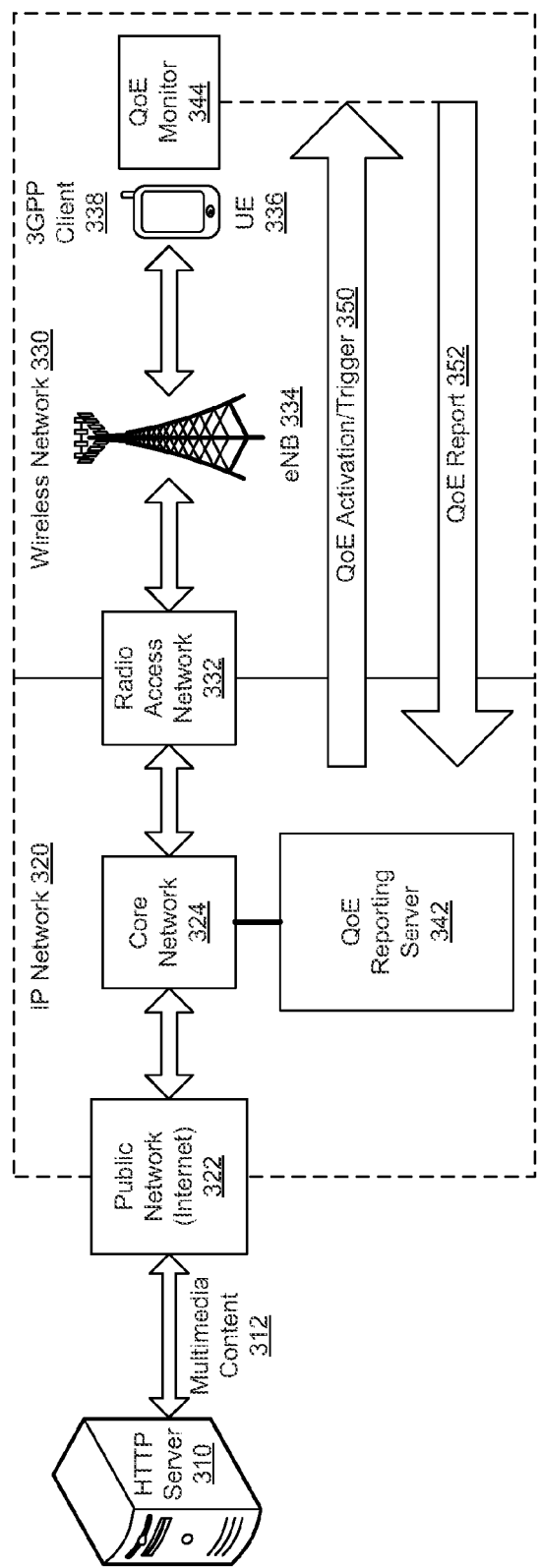
FIG. 2 illustrates a block diagram of a quality of experience (QoE) reporting framework for hypertext transfer protocol (HTTP) streaming in accordance with an example.

QoE evaluation methodologies, performance metrics, and reporting protocols and/or mechanisms can be used to optimize the delivery of HTTP streaming and DASH services. For example, QoE monitoring and feedback can be beneficial for detecting and debugging failures, managing streaming performance, enabling intelligent client adaptation (which can be useful for device manufacturers) and allowing for QoE-aware network adaptation and service provisioning (which can be useful for the network operator and content/service provider). FIG. 2 illustrates an example QoE reporting framework. The QoE monitoring and reporting framework can include the following: a QoE reporting server 342 that can activate or trigger QoE reporting 350, request a set of QoE metrics to be reported, and/or configures a QoE reporting framework; a client that can monitor 244 or measure the requested QoE metrics according to a QoE configuration; and the client that can report the measured QoE parameters 352 to the QoE reporting server. The QoE reporting server can include a network server. In an example, a core network (CN) 324 of an IP network 320 can include the QoE reporting server. A user equipment (UE) 336 can include the QoE monitoring or measuring function. The UE can operate as a 3GPP client for an HTTP server 310.

FIGS. 2 and 3 illustrate the flow of multimedia content 312 between the HTTP server 310 providing the multimedia content and the UE 336. The HTTP server can interface with a public network 322 (or the Internet) in communication with the core network 324. The core network can access a wireless network 330 via a radio access network (RAN) 332. The RAN can provide the multimedia content to the UE via a node (e.g., an evolved Node B (eNB) 334). Unlike the CN, the RAN may provide lower layer (e.g., PHY layer) metrics and optimization for the QoE reporting server adapted to the wireless network.

A QoE-aware radio access network (RAN) architecture can be used to improve or optimize HTTP-based video streaming over cellular and/or wireless networks, where components of a QoE-aware system 340 can operate in the RAN, as illustrated in FIG. 3. The QoE-aware system can use QoE-driven cross-layer interface and/or optimization using the first cross-layer capability and/or the second cross-layer capability. The QoE-aware system can include the QoE reporting server 342, QoE-aware radio resource management (RRM) 346, and QoE-aware server/proxy 348 (or proxy server). In an example, the QoE reporting server can be moved from the CN to the RAN. For example, the QoE reporting server can be located in a node (e.g., eNB) of the RAN. In another example, another QoE reporting server can be added to the RAN in addition to a QoE reporting server at the CN.

The QoE reporting server 342 can be used to activate or trigger QoE feedback of a QoE metric from the UE. The UE can report the QoE metric to the QoE reporting server in a QoE report. QoE metric signaling over a RAN air interface signaling mechanism, in addition to service and/or application layer signaling, can be used. In an example, QoE metrics that can be signaled over the air interface can include a buffer level, which can provide a list of buffer occupancy level measurements carried out during a playout. As part of a buffer level metric, the client can measure and report the buffer level that indicates a playout duration for which media data is available starting from a current playout time along with a time of the measurement of the buffer level. From buffer level measurements, the client can also measure and report a rebuffering percentage, which can be a percentage of a total presentation time in which the user experiences re-buffering due to buffer starvation. Other QoE metrics can include a video quality metric (e.g., peak signal to noise ratio (PSNR), video quality metric (VQM), structural similarity metric (SSIM), perceptual evaluation of video quality metric (PEVQ), video mean opinion score (MOS), or other subjective quality metric), initial playout delay (e.g., a time from when the client initiates a HTTP-based delivery service to a time at which a first received media segment is retrieved from the client buffer) and media presentation description (MPD) information (including media representation attributes on bitrate, resolution, quality ranking and/or codec-related media information including profile or level).

The reporting of QoE-related metric feedback can be realized either in the application and/or service layers (e.g., using of HTTP POST signaling carrying extensible markup language (XML) formatted metadata in the body of the request) or lower layers (e.g., physical layer). For example, for layer 1 reporting, feedback may be combined with aperiodic channel state information (CSI) reports carried by a physical uplink shared channel (PUSCH) by extending a legacy aperiodic CSI feedback feature. For such a design option, additional CSI feedback mode(s) can be defined. Layer 1 QoE reporting (or other lower layer reporting) can have reduced signaling overhead relative to application and/or service layer feedback from the overhead perspective. As used herein, references to the application layer refer to the application layer and/or service layer. In another example, the QoE metric can be measured at the application layer or extracted from a lower layer using an application programming interface (API). POST is one of many request methods supported by the HTTP protocol. The POST request can submit data to be processed (e.g., from an HTML form) to an identified resource. The data can be included in the body of the request, which can result in the creation of a new resource or the updates of existing resources or both.

Given that the relative frequency of QoE report requests can be much lower compared to typical CSI feedback, QoE reporting via layer 1, after appropriate quantization and encoding, can be realized efficiently in practice. Additional cross-layer interfacing for the communication of the QoE metric derived in the application layer to the data link and physical layers can be used at the UE for layer 1 QoE reporting. To support QoE-aware user scheduling, admission control, link adaptation, and other QoE-aware functions, similar cross-layer interfacing can be applied at the network side (e.g., QoE reporting server 342 or QoE-aware system 340) as well.

The QoE-aware system 340 can provide QoE-aware radio resource management (RRM) 346 and link adaptation. RRM can refer to the system level control of co-channel interference and other radio transmission characteristics in wireless communication systems, which can involve strategies and processes for controlling parameters, such as transmit power, channel allocation, data rates, handover criteria, modulation scheme, or error coding scheme. RRM can be used to utilize limited radio spectrum resources and radio network infrastructure as efficiently as possible. Link adaptation, or adaptive coding and modulation (ACM), can refer to the matching of the modulation, coding and other signal and protocol parameters to the conditions on the radio link (e.g., the pathloss, the interference due to signals coming from other transmitters, the sensitivity of the receiver, or the available transmitter power margin).

QoE-aware RRM and link adaptation signaling allows a RAN level network entity to have direct access to the QoE metrics and perform QoE-aware radio resource management and link adaptation functions, such as scheduling, admission control, modulation and coding scheme (MCS) selection, based on the knowledge of the QoE reports from the UEs. For example, QoE feedback can be used to improve or optimize link adaptation especially during broadcasting (e.g., for multimedia broadcast and multicast service (MBMS)) where automatic repeat request (ARQ) and/or hybrid ARQ (HARQ) retransmission mechanisms may not be available to ensure good reliability. Therefore, QoE feedback at the application layer or a RAN layer can be used to improve link quality. A RAN layer can include the lower layers (e.g., physical, data link, network, or transport layers), which can include a lower layer parameter that be modified by an application layer, or the lower layer parameter measured for use to modify an application layer parameter. During broadcasting (using MBMS or unicast signaling), the RAN can collect QoE reports from a subset of UEs used in the broadcast to provide QoE-aware RRM and link adaptation.

In another example, depending on the QoE reports, multiuser scheduling can be performed subject to certain QoE constraints (e.g., assuming a rebuffering percentage requirement on a group of UEs in the network). Certain UEs can be prioritized during scheduling (e.g., if the certain UEs are about to experience rebuffering due to poor link throughput) and the radio resource management framework can be used to optimize a rebuffering outage capacity metric by finding a better compromise between high video quality, minimal occurrences of rebuffering events, and delivering enhanced QoE to a larger number of clients.

In a configuration, the rebuffering outage capacity ($C_{rebuf}^{out}$) can represent a number of active users that can simultaneously stream video where users (e.g., UEs) are satisfied a coverage threshold $A^{cov}$ percent of the time, with a user being counted as satisfied if the rebuffering percentage in the user's video streaming session is less than or equal to an outage threshold $A^{out}$. The rebuffering outage capacity can be represented by Equation 1.

$$C_{rebuf}^{out} = E\left[\operatorname*{argmax}_K \left\{ \frac{\sum_{i=1}^{K} I(\rho_{rebuf,i} \leq A^{out})}{K} \geq A^{cov} \right\} \right], \quad \text{[Equation 1]}$$

where E[.] denotes an expectation, I is an indicator function, $\rho_{rebuf,i}$ is a rebuffering percentage for a user (e.g., UE) with a integer index i, and K is a total integer number of users supported by a network or evaluated for QoE rescheduling. The expectation can occur over multiple user geometry realizations. The outage threshold ($A^{out}$) can be define for a satisfied user and the coverage threshold ($A^{cov}$) can define a fraction of satisfied users for a group of users. For example, $A^{out}$ can be defined as a 2% frame loss and $A^{cov}$ can be defined as 98% for near-realtime services. In an example, an outage threshold can be defined in terms of maximum allowable rebuffering percentage.

In another example, a QoE-aware scheduling process can be based on the rebuffering percentage metric to further support the QoE-aware radio resource management component. A conventional scheduler (like proportional fair) can be based on an average rate based utility function, which may correlate poorly with a playback buffer state of the users. A combined utility function $U(\bar{r},f)$ can be represented by Equation 2.

$$U(\bar{r},f) = \log(\bar{r}) - \alpha \exp(-\beta(f-f_{min})) \quad \text{[Equation 2]},$$

where $\bar{r}$ is the average user rate (actual units of metrics can be irrelevant as a scheduling decision may depend on a maximum gradient direction), f is a number of video frames in the playback buffer, $f_{min}$ is minimum number of video frames in a playback buffer before rebuffering, and parameters $\alpha$ and $\beta$ determine a rate at which a penalty for violating a constraint increases. As long as the video frames in the playback buffer f exceed the minimum value of $f_{min}$, then Equation 2 can be approximately the utility corresponding to proportional fair (PF). When the playback buffer f drops below the minimum value $f_{min}$ then the utility function can rapidly decrease forcing the scheduler to serve users with video frames below the minimum (since a gradient rapidly increases). The function as in the second term (i.e., $\alpha \exp(-\beta(f-f_{min}))$) can be referred to as barrier function since the function can serve to perform a flexible "barrier" around a feasible region.

In another configuration, the resource allocation can be defined as maximizing the sum-utility across k users, where the sum-utility function maximum can be represented by Equation 3.

$$\max S_U(\vec{r},\vec{f}) = \sum_{i=1}^{k} U_i, \quad \text{[Equation 3]}$$

where each $U_i$ is given by Equation 2. The resultant scheduling decision in a scheduling opportunity can then be a choice of the user given by Equation 4.

$$j^* = \operatorname*{argmax}_j \left\{ \frac{\alpha d_j}{S_{frame,j}} \exp(\beta(f_{min} - f_j)) + \frac{d_j}{R_{smththrpt,j}} \right\}, \quad \text{[Equation 4]}$$

where $S_{frame,j}$ is the size of the video frame in transmission, $d_j$ is the instantaneous data rate, $f_j$ is the number of frames in the playback buffer and $R_{smththrpt,j}$ is smoothed average of delivered throughput of user with integer index j. The sum-utility function maximum metric can use the feedback of each user's playback status.

In an example, the priorities among users for resource allocation can be adjusted based on the dynamic feedback of the QoE metric of rebuffering percentage ($\rho_{rebuf}$). Rebuffering percentage can be the percentage of the total streaming time spent rebuffering. To include fairness in terms of rebuffering percentage, the scheduling metric can be modified by scaling with fairness parameters represented by Expression 1.

$$V_j = \begin{cases} \frac{1 + k \times \rho_{rebuf,j}}{\sum_{i=1}^{k} \rho_{rebuf,i}} & \text{if } \sum_{i=1}^{k} \rho_{rebuf,i} > 0 \\ 1 & \text{otherwise,} \end{cases} \quad \text{[Expression 1]}$$

Applying Expression 1 to the scheduling decision of Equation 4 can be represented by Equation 5.

$$j^* = \operatorname*{argmax}_j \left\{ V_j \left( \frac{\alpha d_j}{S_{frame,j}} \exp(\beta(f_{min} - f_j)) + \frac{d_j}{R_{smththrpt,j}} \right) \right\}, \quad \text{[Equation 5]}$$

The j* metric represented by Equation 5 can be referred to as a proportional fair with barrier for frames (PFBF). Although, a PFBF QoE-aware scheduling process is illustrated, other QoE-aware scheduling processes using a QoE-related metric derived from a QoE-driven cross-layer interface may also be used.

The QoE-aware system 340 can include the QoE-aware proxy server (or QoE-aware server/proxy 348). Proxy server terminals at the RAN network can be used intercept application layer signaling (e.g., over HTTP request-response transactions) and execute various HTTP server functionalities, such as storing, transcoding, modifying, and distributing media fragments and related metadata (e.g., MPDs). For example, proxy server functionality can use the QoE reports to modify the MPDs distributed to the clients, which can limit the available bitrates accessible by the clients in order to maintain fairness in terms of QoE (e.g., rebuffering percentage) and manage capacity resources efficiently, which can be similar to enforcing quality of service (QoS) policies, such as guaranteed bitrate or maximum bitrate in an MPD-dependent fashion. In an example, the set of multimedia-specific application-layer parameters in the MPD can include at least one of: A multimedia bitrate, multimedia resolution, multimedia encoder frame rate, multimedia codec information, rate-distortion function for the multimedia stream, 3D video format information, other QoE or multimedia quality metric, number of group of pictures (GOP) frames, quantization parameters for different frames, layer type in case of scalable video coding (SVC), application-level (APP-level) forward error correction (FEC), or application-level constraints and target QoS parameters.

The multimedia bitrate can include a 'bandwidth' attribute of each DASH representation. The multimedia resolution can include a horizontal and vertical resolution attributes of each DASH representation. The multimedia encoder frame rate can include a 'mimeType' attribute of each DASH representation, which can also describe other codec-related parameters. The multimedia codec information can include a codec type, such as adaptive multi-rate (AMR), moving picture experts group standard 4 (MPEG4), H.264 advanced video coding/scalable video coding (AVC/SVC), profiles, or levels, as included in the 'mimeType' attribute of each DASH representation. AMR is an audio data compression scheme optimized for speech coding using the AMR codec adopted as a standard speech codec by 3GPP. In an example, AMR can use link adaptation to select from one of eight different bit rates based on link conditions. MPEG4 and/or H.264 AVC/SVC provide a protocol and standard for audio and visual (AV) digital data compression including compression of AV data for web (e.g., streaming media) and CD distribution, voice (telephone, videophone), and broadcast television applications. MPEG4 and/or H.264 AVC/SVC can be used for recording, compression, and distribution of high definition video. SVC allows the construction of bitstreams that contain sub-bitstreams that also conform to the standard or protocol. The rate-distortion function for the multimedia stream can be relevant for a 'qualityRanking' attribute of each DASH representation. The 3D video format information can include a frame compatible 3D video format and a temporal interleaving arrangement. Other QoE or multimedia quality metrics can be specified at different rates, reference, reduced-reference or non-reference metrics (e.g., video quality metrics (VQM), structural similarity metrics (SSIM), perceptual evaluation of video quality metrics (PEVQ), video mean opinion scores (MOS), and other subjective quality metrics). The number of GOP frames can include the GOP size and frame type (e.g., I-frame, P-frame, B-frame, and similar types of frames). The quantization parameters for different frames can include varying quantization scales for I, P, B frames. The layer type in case of SVC can include a base layer and an enhancement layer. The APP-level FEC can include erasure coding or network coding parameters. FEC can be a technique used for controlling errors in data transmission over unreliable or noisy communication channels, where the sender can encode a message in a redundant way by using an error-correcting code (ECC). Application-level constraints and target QoS parameters can include delay, jitter, or quality.

Figure 4:
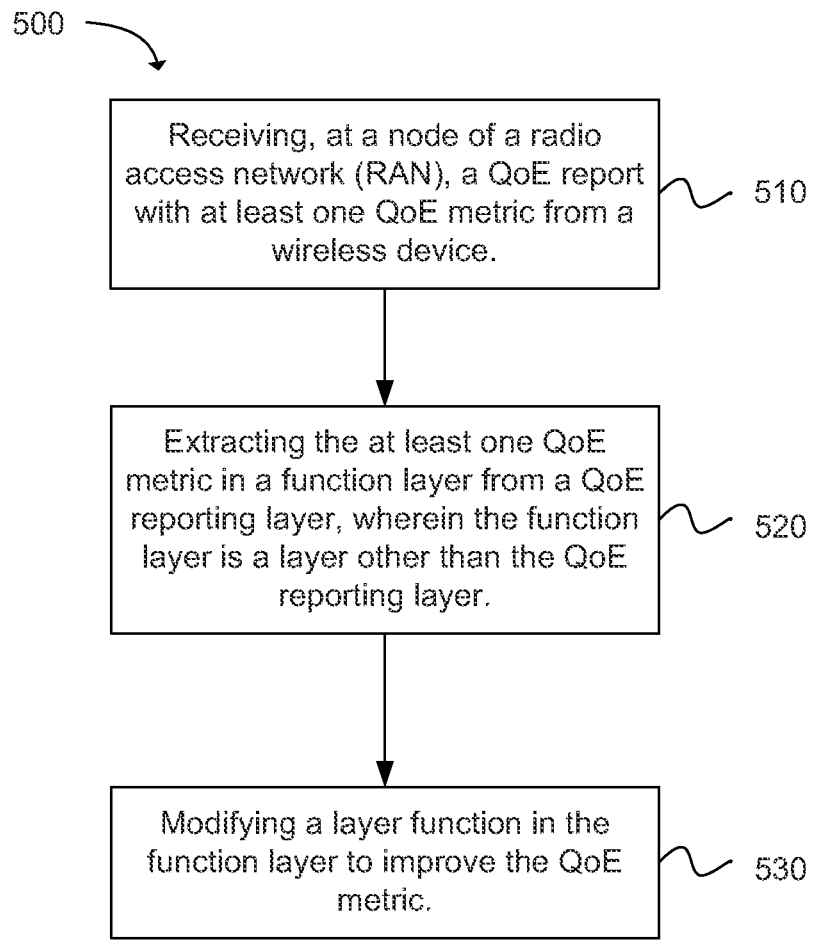
FIG. 4 depicts a flow chart of a method for adapting a video stream using a quality of experience (QoE) report in accordance with an example.

Another example provides a method 500 for adapting a video stream using a quality of experience (QoE) report, as shown in the flow chart in FIG. 4. The method may be executed as instructions on a machine, where the instructions are included on at least one computer readable medium or one non-transitory machine readable storage medium. The method includes the operation of receiving, at a node of a radio access network (RAN), a QoE report with at least one QoE metric from a wireless device, as in block 510. The operation of extracting the at least one QoE metric in a function layer from a QoE reporting layer, wherein the function layer is a layer other than the QoE reporting layer follows, as in block 520. The next operation of the method can be modifying a layer function in the function layer to improve the QoE metric, as in block 530.

In an example, the QoE reporting layer can include an application layer, a service layer, a session layer, or a hypertext transfer protocol (HTTP) layer. The function layer can include a physical layer (PHY), a link layer, a media access control (MAC) layer, a radio resource control (RRC) layer, a network layer, or an internet protocol (IP) layer. The layer function can include scheduling, admission control, modulation and coding scheme (MCS) selection, link adaptation, radio resource management (RRM), or quality of service (QoS) configuration. The QoE metric can include a buffer level, playout duration, rebuffering percentage, peak signal to noise ratio (PSNR), video quality metric (VQM), structural similarity metric (SSIM), perceptual evaluation of video quality metric (PEVQ), video mean opinion scores (MOS), subjective quality metric, initial playout delay, or media presentation description (MPD) information.

In another example, the QoE reporting layer can include a physical layer (PHY), a link layer, a media access control (MAC) layer, a radio resource control (RRC) layer, a network layer, or an internet protocol (IP) layer. The function layer can include an application layer, a service layer, a session layer, or a hypertext transfer protocol (HTTP) layer. The layer function can modify a parameter, including a buffer level, playout duration, rebuffering percentage, peak signal to noise ratio (PSNR), video quality metric (VQM), structural similarity metric (SSIM), perceptual evaluation of video quality metric (PEVQ), video mean opinion scores (MOS), subjective quality metric, initial playout delay, or media presentation description (MPD) information. A multimedia-specific application-layer parameter in the MPD information can include a multimedia bitrate, multimedia resolution, multimedia encoder frame rate, multimedia codec information, rate-distortion function for a multimedia stream, segment format information, three dimensional (3D) video format information, QoE metric, multimedia quality metric, number of group of picture (GOP) frames, quantization parameter for different frames, layer type in case of scalable video coding (SVC), application-level forward error correction (FEC) parameter, erasure coding parameter, network coding parameter, transport-specific parameter, application-level constraint, or target quality of service (QoS) parameter. The QoE metric can include a channel condition, channel state information (CSI), resource availability, modulation and coding scheme (MCS), PHY layer parameter, link layer parameter, MAC layer parameter, RRC layer parameter, network layer parameter, or IP layer parameter.

In a configuration, the method can further include: Activating QoE reporting for a wireless device; requesting the at least one QoE metric to be reported by the wireless device; configuring a QoE reporting framework for a QoE reporting server; intercepting application layer signaling or service layer signaling for the at least one QoE metric; or executing hypertext transfer protocol (HTTP) server functions. The operation of executing HTTP server functions can further include: Storing a QoE report, a media fragment, or media metadata; transcoding the media fragment based on the QoE report; modifying the media fragment or media metadata based on the QoE report; or distributing the QoE report, the media fragment, or the media metadata using the HTTP protocol.

In an example, the operation of extracting the at least one QoE metric can use an application programming interface (API).

Figure 5:
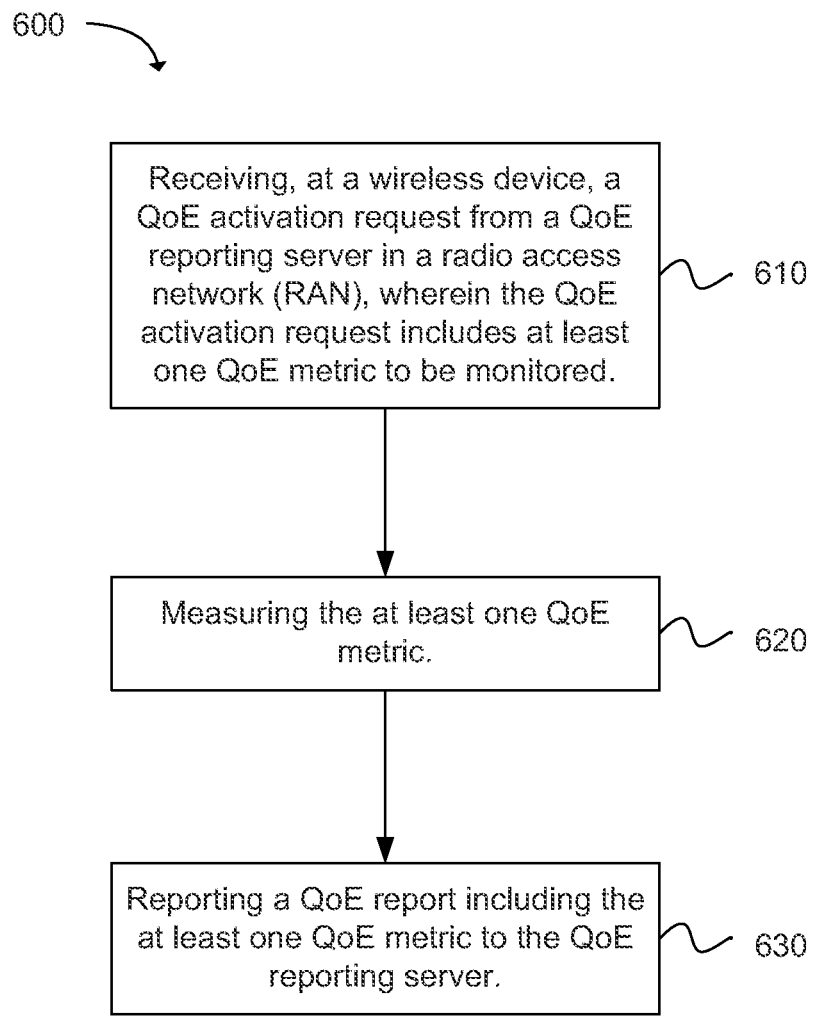
FIG. 5 depicts a flow chart of a method for monitoring a video stream using a quality of experience (QoE) report in accordance with an example.

Another example provides a method 600 for monitoring a video stream using a quality of experience (QoE) report, as shown in the flow chart in FIG. 5. The method may be executed as instructions on a machine, where the instructions are included on at least one computer readable medium or one non-transitory machine readable storage medium. The method includes the operation of receiving, at a wireless device, a QoE activation request from a QoE reporting server in a radio access network (RAN), wherein the QoE activation request includes at least one QoE metric to be monitored, as in block 610. The operation of measuring the at least one QoE metric follows, as in block 620. The next operation of the method can be reporting a QoE report including the at least one QoE metric to the QoE reporting server, as in block 630.

In an example, the QoE metric can include a buffer level, playout duration, rebuffering percentage, peak signal to noise ratio (PSNR), video quality metric (VQM), structural similarity metric (SSIM), perceptual evaluation of video quality metric (PEVQ), video mean opinion scores (MOS), subjective quality metric, initial playout delay, or media presentation description (MPD) information. A multimedia-specific application-layer parameter in the MPD information can include a multimedia bitrate, multimedia resolution, multimedia encoder frame rate, multimedia codec information, rate-distortion function for a multimedia stream, segment format information, three dimensional (3D) video format information, QoE metric, multimedia quality metric, number of group of picture (GOP) frames, quantization parameter for different frames, layer type in case of scalable video coding (SVC), application-level forward error correction (FEC) parameter, erasure coding parameter, network coding parameter, transport-specific parameter, application-level constraint, or target quality of service (QoS) parameter.

In another example, the method can further include: Receiving, at the wireless device, a modified parameter from the QoE reporting server based on the QoE report; and modifying a wireless device parameter based on the modified parameter.

Figure 6:
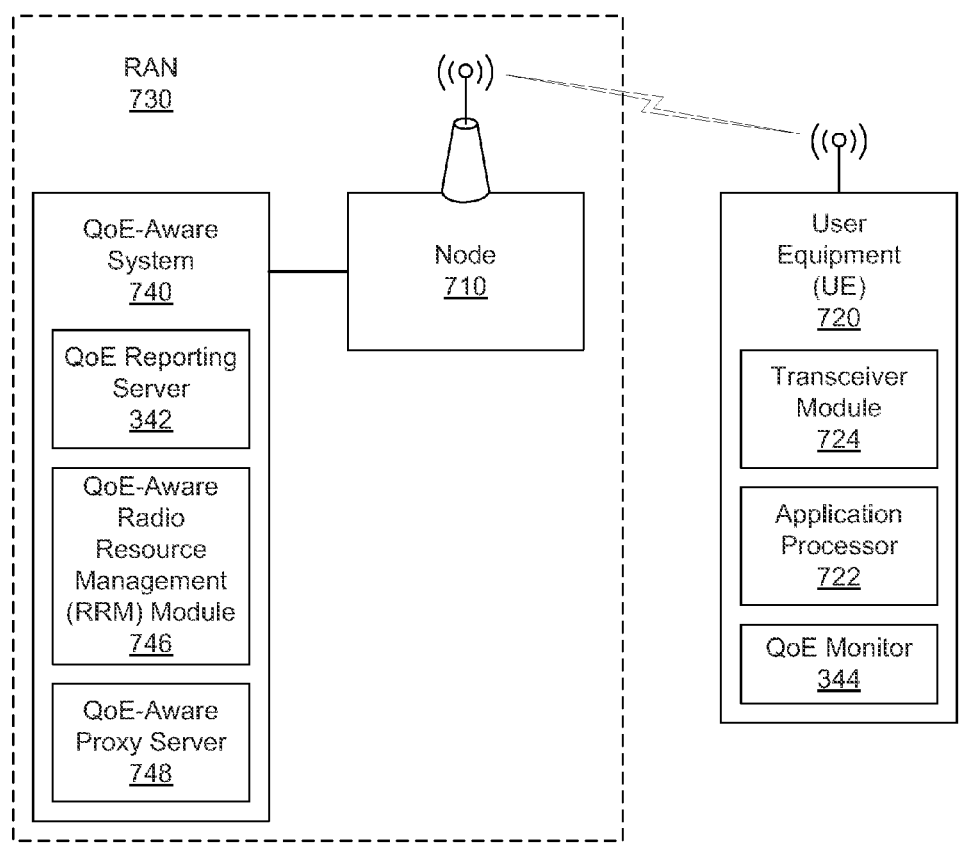
FIG. 6 illustrates a block diagram of a quality of experience-aware (QoE-aware) system, a node, and a user equipment (UE) in accordance with an example.

FIG. 6 illustrates an example quality of experience-aware (QoE-aware) system 740 and example node 710 in a radio access network (RAN) 730 and an example wireless device 720. The QoE-aware system can be configured to interface with hypertext transfer protocol (HTTP)-based video streaming. The QoE-aware system can include a quality of experience (QoE) reporting server 342, a QoE radio resource management (RRM) module 746, and a QoE-aware proxy server 748. The QoE reporting server can be configured to receive a QoE report with at least one QoE metric in a first layer from a wireless device and provide the at least one QoE metric to a second layer via a cross-layer interface. The QoE reporting server can be further configured to: Activate QoE reporting for the wireless device; request the at least one QoE metric to be reported; or configure a QoE reporting framework. The QoE metric can include a buffer level, playout duration, rebuffering percentage, peak signal to noise ratio (PSNR), video quality metric (VQM), structural similarity metric (SSIM), perceptual evaluation of video quality metric (PEVQ), video mean opinion scores (MOS), subjective quality metric, initial playout delay, and media presentation description (MPD) information.

The QoE radio resource management (RRM) module 746 can be configured to provide an RRM function or a link adaptation function based on the at least one QoE metric. In an example, the RRM function or the link adaptation function can include scheduling, admission control, modulation and coding scheme (MCS) selection, or quality of service (QoS) configuration. The QoE RRM module can be configured to make a scheduling decision using $$\frac{\alpha d_j}{S_{frame,j}} \exp(\beta(f_{min} - f_j)),$$

where $S_{frame,j}$ is a size of a video frame in transmission, $d_j$ is an instantaneous data rate, $f_j$ is a number of frames in a playback buffer, $f_{min}$ is a minimum number of frames allowed in the playback buffer, $\alpha$ is a penalty rate for violating a $$\frac{d_j}{S_{frame,j}}$$

constraint, and $\beta$ is a penalty rate for violating a number of frames in the playback buffer constraint. The QoE RRM module can be further configured to access a subset of QoE reports from a plurality of wireless devices, and provide the RRM function and the link adaptation function for delivery of multimedia broadcast and multicast services (MBMS) based on the at least one QoE metric from the subset of QoE reports.

The QoE-aware proxy server 748 can be configured to intercept service layer signaling including a media fragment or a media metadata and perform an HTTP server function on the media fragment or media metadata based on the QoE report. The HTTP server function can include storing, transcoding, modifying, or distributing the media fragment or media metadata. The media metadata can include a media presentation description (MPD) metadata file. The QoE-aware proxy server can be configured to perform a HTTP server function on a multimedia-specific application-layer parameter in the MPD metadata file. The multimedia-specific application-layer parameter can include a multimedia bitrate, multimedia resolution, multimedia encoder frame rate, multimedia codec information, rate-distortion function for a multimedia stream, segment format information, three dimensional (3D) video format information, QoE metric, multimedia quality metric, number of group of picture (GOP) frames, quantization parameter for different frames, layer type in case of scalable video coding (SVC), application-level forward error correction (FEC) parameter, erasure coding parameter, network coding parameter, transport-specific parameter, application-level constraint, or target quality of service (QoS) parameter.

The node 710 can include a base station (BS), a Node B (NB), an evolved Node B (eNB), a baseband unit (BBU), a remote radio head (RRH), a remote radio equipment (RRE), or a remote radio unit (RRU).

The wireless device 720 (e.g., UE) can include a transceiver module 724, an application processor 722, and a QoE monitor 344. The wireless device can be configured to provide quality of experience (QoE) monitoring for dynamic adaptive streaming over hypertext transfer protocol (HTTP) (DASH). The transceiver module can be configured to receive a QoE activation request from a QoE reporting server in a radio access network (RAN). The QoE activation request can include at least one QoE metric to be monitored. The QoE monitor can be configured to measure the at least one QoE metric on the wireless device. The transceiver module can be further configured to report the at least one QoE metric in a QoE report to the QoE reporting server. The QoE metric can include a buffer level, playout duration, rebuffering percentage, peak signal to noise ratio (PSNR), video quality metric (VQM), structural similarity metric (SSIM), perceptual evaluation of video quality metric (PEVQ), video mean opinion scores (MOS), subjective quality metric, initial playout delay, or media presentation description (MPD) information.

In an example, the transceiver module 724 can be further configured to receive a modified parameter from the QoE reporting server based on the QoE report. The processing module 722 can be configured to modify a wireless device parameter based on the modified parameter. The modified parameter can include a modulation and coding scheme (MCS), PHY layer parameter, link layer parameter, MAC layer parameter, RRC layer parameter, network layer parameter, IP layer parameter, or a multimedia-specific application-layer parameter in a media presentation description (MPD) metadata file. The multimedia-specific application-layer parameter in the MPD metadata file can include a multimedia bitrate, multimedia resolution, multimedia encoder frame rate, multimedia codec information, rate-distortion function for a multimedia stream, segment format information, three dimensional (3D) video format information, QoE metric, multimedia quality metric, number of group of picture (GOP) frames, quantization parameter for different frames, layer type in case of scalable video coding (SVC), application-level forward error correction (FEC) parameter, erasure coding parameter, network coding parameter, transport-specific parameter, application-level constraint, or target quality of service (QoS) parameter.

Figure 7:
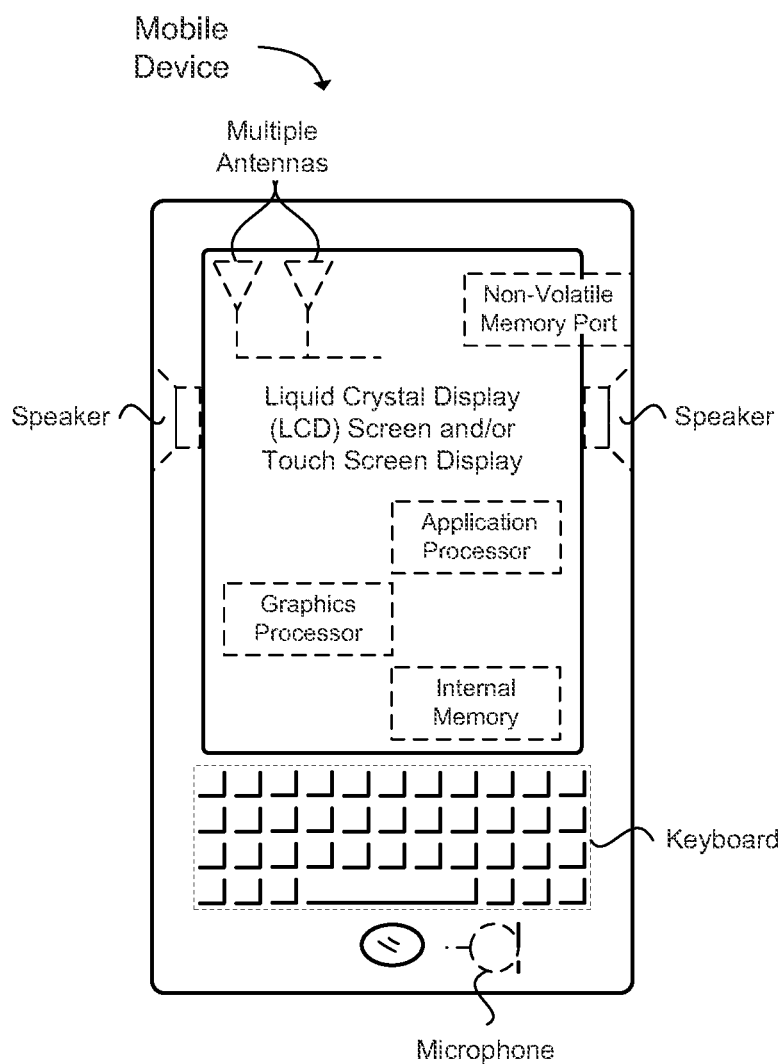
FIG. 7 illustrates a diagram of a user equipment (UE) in accordance with an example.

FIG. 7 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device.

The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for adapting a video stream using a quality of experience (QoE) report, comprising:
receiving, at a node in a radio access network (RAN), a QoE report with at least one QoE metric from a wireless device;
extracting the at least one QoE metric in a function layer from a QoE reporting layer, wherein the function layer is a layer other than the QoE reporting layer; and
modifying, at the node in the RAN, a layer function in the function layer based on the QoE metric in the QoE report in order to perform a QoE-aware radio resource management (RRM) scheduling function to improve the QoE metric for the wireless device, wherein performing the QoE-aware RRM scheduling function comprises performing RRM scheduling based on (i) a first product of a frame rate and a penalty rate for violating a constraint on the frame rate, (ii) a second product of a penalty rate for violating a number of frames in a playback buffer constraint and a difference between number of frames in the playback buffer and the minimum allowed number of frames in the playback buffer and (iii) a product of the first product and exp(x), wherein x is the second product.

2. The method of claim 1, wherein:
the QoE reporting layer is selected from the group consisting of an application layer, a service layer, a session layer, and a hypertext transfer protocol (HTTP) layer; and
the function layer is selected from the group consisting of a physical layer (PHY), a link layer, a media access control (MAC) layer, a radio resource control (RRC) layer, a network layer, and an internet protocol (IP) layer.

3. The method of claim 2, wherein
the layer function in the function layer is modified to further perform admission control, modulation and coding scheme (MCS) selection, link adaptation, radio resource management (RRM), quality of service (QoS) configuration, and combinations thereof; and
the QoE metric is selected from the group consisting of a buffer level, playout duration, rebuffering percentage, peak signal to noise ratio (PSNR), video quality metric (VQM), structural similarity metric (SSIM), perceptual evaluation of video quality metric (PEVQ), video mean opinion scores (MOS), subjective quality metric, initial playout delay, media presentation description (MPD) information, and combinations thereof.

4. The method of claim 1, wherein:
the QoE reporting layer is selected from the group consisting of a physical layer (PHY), a link layer, a media access control (MAC) layer, a radio resource control (RRC) layer, a network layer, and an internet protocol (IP) layer; and
the function layer is selected from the group consisting of an application layer, a service layer, a session layer, and a hypertext transfer protocol (HTTP) layer.

5. The method of claim 4, wherein
the layer function modifies a parameter selected from the group consisting of a buffer level, playout duration, rebuffering percentage, peak signal to noise ratio (PSNR), video quality metric (VQM), structural similarity metric (SSIM), perceptual evaluation of video quality metric (PEVQ), video mean opinion scores (MOS), subjective quality metric, initial playout delay, media presentation description (MPD) information, wherein a multimedia-specific application-layer parameter in the MPD information is selected from the group consisting of a multimedia bitrate, multimedia resolution, multimedia encoder frame rate, multimedia codec information, rate-distortion function for a multimedia stream, segment format information, three dimensional (3D) video format information, QoE metric, multimedia quality metric, number of group of picture (GOP) frames, quantization parameter for different frames, layer type in case of scalable video coding (SVC), application-level forward error correction (FEC) parameter, erasure coding parameter, network coding parameter, transport-specific parameter, application-level constraint, target quality of service (QoS) parameter, and combinations thereof; and
the QoE metric is selected from the group consisting of a channel condition, channel state information (CSI), resource availability, modulation and coding scheme (MCS), PHY layer parameter, link layer parameter, MAC layer parameter, RRC layer parameter, network layer parameter, IP layer parameter, and combinations thereof.

6. The method of claim 1, further comprising:
activating QoE reporting for a wireless device;
requesting the at least one QoE metric to be reported by the wireless device;

configuring a QoE reporting framework for a QoE reporting server;
intercepting application layer signaling or service layer signaling for the at least one QoE metric; or
executing hypertext transfer protocol (HTTP) server functions, wherein executing HTTP server functions, further comprises:
storing a QoE report, a media fragment, or media metadata;
transcoding the media fragment based on the QoE report;
modifying the media fragment or media metadata based on the QoE report; or
distributing the QoE report, the media fragment, or the media metadata using the HTTP protocol.

7. The method of claim 1, wherein extracting the at least one QoE metric uses an application programming interface (API).

8. The method of claim 1, wherein the node selected from the group consisting of an a base station (BS), a Node B (NB), an evolved Node B (eNB), a baseband unit (BBU), a remote radio head (RRH), a remote radio equipment (RRE), a remote radio unit (RRU), and combinations thereof.

9. At least one non-transitory machine readable storage medium comprising a plurality of instructions adapted to be executed to implement the method of claim 1.

10. A quality of experience-aware (QoE-aware) system for hypertext transfer protocol (HTTP)-based video streaming, comprising:
a quality of experience (QoE) reporting server to receive a QoE report with at least one QoE metric in a first layer from a wireless device and provide the at least one QoE metric to a second layer via a cross-layer interface; and
a QoE radio resource management (RRM) module to provide a QoE-aware RRM scheduling function based on the at least one QoE metric in the QoE report in order to improve the QoE metric for the wireless device, wherein the QoE-aware RRM scheduling function comprises performing RRM scheduling based on (i) a first product of a frame rate and a penalty rate for violating a constraint on the frame rate, (ii) a second product of a penalty rate for violating a number of frames in a playback buffer constraint and a difference between number of frames in the playback buffer and the minimum allowed number of frames in the playback buffer and (iii) a product of the first product and exp(x), wherein x is the second product.

11. The QoE-aware system of claim 10, wherein the QoE-aware system is located within a radio access network (RAN).

12. The QoE-aware system of claim 11, wherein the RAN includes a node selected from the group consisting of an a base station (BS), a Node B (NB), an evolved Node B (eNB), a baseband unit (BBU), a remote radio head (RRH), a remote radio equipment (RRE), a remote radio unit (RRU), and combinations thereof.

13. The QoE-aware system of claim 10, wherein the QoE RRM module is further configured to provide QoE-aware RRM functions for admission control, modulation and coding scheme (MCS) selection, quality of service (QoS) configuration, and combinations thereof.

14. The QoE-aware system of claim 10, wherein the performing RRM scheduling using the product of the first product and the exp(x) comprises making a scheduling decision using $$\frac{\alpha d_j}{S_{frame,j}} \exp(\beta(f_{min} - f_j)),$$

where $S_{frame,j}$ is the size of a video frame in transmission, $d_j$ is the instantaneous data rate, $f_j$ is the number of frames in a playback buffer, $f_{min}$ is the minimum number of frames allowed in the playback buffer, $\alpha$ is the penalty rate for violating a $$\frac{d_j}{S_{frame,j}}$$

constraint, and $\beta$ is the penalty rate for violating the number of frames in the playback buffer constraint.

15. The QoE-aware system of claim 10, wherein the QoE RRM module is further configured to access a subset of QoE reports from a plurality of wireless devices, and provide the RRM function and the link adaptation function for delivery of multimedia broadcast and multicast services (MBMS) based on the at least one QoE metric from the subset of QoE reports.

16. The QoE-aware system of claim 10, further comprising:
a QoE-aware proxy server to intercept service layer signaling including a media fragment or a media metadata and perform an HTTP server function on the media fragment or media metadata based on the QoE report.

17. The QoE-aware system of claim 16, wherein the HTTP server function is selected from the group consisting of storing, transcoding, modifying, distributing, and combinations thereof.

18. The QoE-aware system of claim 16, wherein the media metadata includes a media presentation description (MPD) metadata file and the QoE-aware proxy server is configured to perform a HTTP server function on a multimedia-specific application-layer parameter in the MPD metadata file, wherein the multimedia-specific application-layer parameter is selected from the group consisting of a multimedia bitrate, multimedia resolution, multimedia encoder frame rate, multimedia codec information, rate-distortion function for a multimedia stream, segment format information, three dimensional (3D) video format information, QoE metric, multimedia quality metric, number of group of picture (GOP) frames, quantization parameter for different frames, layer type in case of scalable video coding (SVC), application-level forward error correction (FEC) parameter, erasure coding parameter, network coding parameter, transport-specific parameter, application-level constraint, target quality of service (QoS) parameter, and combinations thereof.

19. The QoE-aware system of claim 10, wherein the QoE reporting server is further configured to:
activate QoE reporting for the wireless device;
request the at least one QoE metric to be reported; and
configure a QoE reporting framework.

20. The QoE-aware system of claim 10, wherein the QoE metric is selected from the group consisting of a buffer level, playout duration, rebuffering percentage, peak signal to noise ratio (PSNR), video quality metric (VQM), structural similarity metric (SSIM), perceptual evaluation of video quality metric (PEVQ), video mean opinion scores (MOS), subjective quality metric, initial playout delay, media presentation description (MPD) information, and combinations thereof.

21. A wireless device for providing quality of experience (QoE) monitoring for dynamic adaptive streaming over hypertext transfer protocol (HTTP) (DASH), comprising:
- a transceiver module to receive a QoE activation request from a QoE reporting server in a radio access network (RAN), wherein the QoE activation request includes at least one QoE metric to be monitored; and
- a QoE monitor to measure the at least one QoE metric on the wireless device,
- wherein the transceiver module is further configured to report the at least one QoE metric in a QoE report to the QoE reporting server, wherein the QoE reporting server is configured to perform a QoE-aware radio resource management (RRM) scheduling function by performing RRM scheduling based on (i) a first product of a frame rate and a penalty rate for violating a constraint on the frame rate, (ii) a second product of a penalty rate for violating a number of frames in a playback buffer constraint and a difference between number of frames in the playback buffer and the minimum allowed number of frames in the playback buffer and (iii) a product of the first product and exp(x), wherein x is the second product.

22. The wireless device of claim 21, wherein the QoE metric is selected from the group consisting of a buffer level, playout duration, rebuffering percentage, peak signal to noise ratio (PSNR), video quality metric (VQM), structural similarity metric (SSIM), perceptual evaluation of video quality metric (PEVQ), video mean opinion scores (MOS), subjective quality metric, initial playout delay, media presentation description (MPD) information, and combinations thereof.

23. The wireless device of claim 21, wherein
- the transceiver module is further configured to receive a modified parameter from the QoE reporting server based on the QoE report; and
- the wireless device further comprises a processing module to modify a wireless device parameter based on the modified parameter,
- wherein the modified parameter is selected from the group consisting of a modulation and coding scheme (MCS), PHY layer parameter, link layer parameter, MAC layer parameter, RRC layer parameter, network layer parameter, IP layer parameter, a multimedia-specific application-layer parameter in a media presentation description (MPD) metadata file, and combinations thereof; and
- the multimedia-specific application-layer parameter in the MPD metadata file is selected from the group consisting of a multimedia bitrate, multimedia resolution, multimedia encoder frame rate, multimedia codec information, rate-distortion function for a multimedia stream, segment format information, three dimensional (3D) video format information, QoE metric, multimedia quality metric, number of group of picture (GOP) frames, quantization parameter for different frames, layer type in case of scalable video coding (SVC), application-level forward error correction (FEC) parameter, erasure coding parameter, network coding parameter, transport-specific parameter, application-level constraint, target quality of service (QoS) parameter, and combinations thereof.

24. The wireless device of claim 21, wherein the wireless device is selected from the group consisting of a user equipment (UE) and a mobile station (MS), and the wireless device includes at least one of an antenna, a touch sensitive display screen, a speaker, a microphone, a graphics processor, an application processor, internal memory, a non-volatile memory port, and combinations thereof.

25. At least one non-transitory machine readable storage medium comprising a plurality of instructions adapted to be executed to implement a method for monitoring a video stream using a quality of experience (QoE) report, comprising:
- receiving, at a wireless device, a QoE activation request from a QoE reporting server in a radio access network (RAN), wherein the QoE activation request includes at least one QoE metric to be monitored;
- measuring the at least one QoE metric; and
- reporting a QoE report including the at least one QoE metric to the QoE reporting server, wherein the QoE reporting server is configured to perform a QoE-aware radio resource management (RRM) scheduling function by performing RRM scheduling based on (i) a first product of a frame rate and a penalty rate for violating a constraint on the frame rate, (ii) a second product of a penalty rate for violating a number of frames in a playback buffer constraint and a difference between number of frames in the playback buffer and the minimum allowed number of frames in the playback buffer and (iii) a product of the first product and exp(x), wherein x is the second product.

26. The at least one non-transitory machine readable storage medium of claim 25, wherein
- the QoE metric is selected from the group consisting of a buffer level, playout duration, rebuffering percentage, peak signal to noise ratio (PSNR), video quality metric (VQM), structural similarity metric (SSIM), perceptual evaluation of video quality metric (PEVQ), video mean opinion scores (MOS), subjective quality metric, initial playout delay, media presentation description (MPD) information, and combinations thereof; and
- a multimedia-specific application-layer parameter in the MPD information is selected from the group consisting of a multimedia bitrate, multimedia resolution, multimedia encoder frame rate, multimedia codec information, rate-distortion function for a multimedia stream, segment format information, three dimensional (3D) video format information, QoE metric, multimedia quality metric, number of group of picture (GOP) frames, quantization parameter for different frames, layer type in case of scalable video coding (SVC), application-level forward error correction (FEC) parameter, erasure coding parameter, network coding parameter, transport-specific parameter, application-level constraint, target quality of service (QoS) parameter, and combinations thereof.

27. The at least one non-transitory machine readable storage medium of claim 25, further comprising:
- receiving, at the wireless device, a modified parameter from the QoE reporting server based on the QoE report; and
- modifying a wireless device parameter based on the modified parameter.

* * * * *